UNITED STATES PATENT OFFICE.

THOMAS STERRY HUNT, OF MONTREAL, QUEBEC, CANADA, AND JAMES DOUGLAS, JR., OF NEW YORK, N. Y.

PROCESS OF EXTRACTING COPPER FROM ITS ORES.

SPECIFICATION forming part of Letters Patent No. 364,174, dated May 31, 1887.

Application filed August 6, 1885. Serial No. 173,766. (No specimens.)

*To all whom it may concern:*

Be it known that we, THOMAS STERRY HUNT, a citizen of the United States, holding his legal residence at Boston, in the State of Massachusetts, but at present residing at Montreal, in the Dominion of Canada, and JAMES DOUGLAS, Jr., a subject of the Queen of Great Britain, residing at New York, in the county of New York and State of New York, have invented a certain new and useful Improvement in the Process of Extracting Copper from its Ores; and we do declare the following to be a full, clear, and exact description of the invention, such as will enable others skilled in the art to which it appertains to make and use the same.

We have previously obtained Letters Patent in the United States, February 9, 1869, No. 86,754, for a regenerative process for the same end, based on dissolving copper from its oxidized ores by a mixed solution of neutral ferrous chloride and common salt, and also one May 25, 1880, No. 227,902, for another regenerative process founded on the precipitation of copper from its chlorinated solutions by sulphurous acid gas, thereby converting the whole of the copper into a comparatively insoluble cuprous chloride of dichloride, with the simultaneous production of free acids, which are used to dissolve oxide of copper from fresh portions of ore. In the first of these processes there is obtained a neutral solution of copper free from arsenic, but holding any silver which may have been present in the ores. In the second process, on the contrary, the silver is left undissolved in the residue from the ore; but the acid liquids remaining after the precipitation of the copper as dichloride may dissolve from fresh portions of ore any arsenic present, which would thus accumulate in the solution. To avoid the risk of contamination of the acid from this source, and at the same time to facilitate the separation of any accompanying silver, we have devised the following method: We begin by treating naturally or artificially oxidized ores of copper which may hold both arsenic and silver with a hot solution of ferrous chloride and common salt, as in the first process, either by agitation or by filtration, according to the richness and state of division of the ores. By this means are produced both cupric and cuprous chlorides, the latter held in solution by the common salt. The clear neutral solution thus obtained being free from arsenic, but holding dissolved any silver which was in the ore, we expose, as in the second process, to the action of sulphurous-acid gas from burning sulphur, or from roasting sulphide ores or sulphurous mattes, and thereby reduce the dissolved cupric chloride to cuprous chloride, with the production of both chlorhydric and sulphuric acids. The dissolving of the copper by the ferrous chloride and the treatment of the resulting solution by sulphurous-acid gas may be carried on simultaneously if stirring-tanks or movable trays for the ores are used, and provided that at the end of the operation the solution remains charged with the precipitated hydrous peroxide of iron, which would be dissolved by an excess of the sulphurous acid. From the solution of copper thus reduced and made acid the dissolved copper may be separated as cement copper by less than one-half its weight of metallic iron, and for this purpose the solution, previously freed from excess of sulphurous acid, (as described in the patent of May 25, 1880, No. 227,902,) should be kept in agitation, and the solution removed from the iron before the complete precipitation of the copper, so that neither the free acid present nor the iron may be wasted. The solution, then holding the free acid together with ferrous chloride, is used to dissolve the oxide of copper from fresh portions of ore either by filtration or agitation—a process which is carried on not only till the free acids are neutralized, but until the ferrous chloride itself is decomposed, with separation of hydrated peroxide of iron, as in the first method. In this way any arsenic dissolved by the free acid in the first stage of the process is separated later on by the peroxide of iron, and a neutral solution is obtained holding the two chlorides of copper. Instead of treating this directly with metallic iron, as in the first method, we may expose it to the action of sulphurous acid, thereby reducing the whole of the dissolved copper to the state of cuprous chloride, as already explained.

If silver be present in the copper ore it will be chloridized and dissolved by the liquid at the same time with the copper, and immediately after the treatment of the solution with sulphurous-acid gas it may be readily separated therefrom by metallic copper, either by the well-known method of filtration or by agitating the hot solution, still holding sulphurous acid with a portion of cement copper, which will precipitate the silver in a metallic state. The same round of operations, consisting of dissolving the oxide of copper, the treatment of the solution with sulphurous-acid gas, and the precipitation therefrom of the silver by copper, and of the copper by metallic iron, thereby regenerating the solvent, may thus be carried on indefinitely, as described.

We do not claim the use of solutions of ferrous chloride for the conversion of oxide of copper into chloride of copper, nor the use of sulphurous-acid gas to convert the cupric chloride thus formed into cuprous chloride with the generation of free chlorhydric and sulphurous acids, as has been fully set forth in our previous patents named and noticed above. In the first of these patents the use of sulphurous-acid gas was applied to the reduction and solution of the precipitated and suspended hydrous peroxide of iron, (which was combined with a little perchloride in an insoluble combination, therein described as an oxychloride of iron,) the dichloride of copper being wholly or in part held in solution by common salt. In the second of these patents, on the contrary, the use of sulphurous acid is claimed only to treat clear solutions previously freed from the suspended hydrous peroxide or oxychloride of iron, for the purpose of precipitating the copper therefrom as cuprous chloride, the presence of common salt to dissolve this being avoided, and to generate free hydrochloric and sulphuric acids. In the new process, on the contrary, an excess of salt is used to keep dissolved the cuprous chloride formed by the action of the sulphurous acid, and subsequently, after the precipitation of the dissolved copper therefrom by metallic iron, the resulting solution, containing protochloride of iron, common salt, and free sulphuric and chlorhydric acids, is used to dissolve fresh oxide of copper from the ore, taking care to carry the operation to the point of separating a portion of the hydrous peroxide of iron, to the end that any arsenic which may have been dissolved shall be rendered insoluble, and thus prevented from contaminating the copper, which is to be precipitated by iron.

Having thus described our invention, what we claim, and desire to secure by Letters Patent, is—

The process of extracting copper from its oxidized ores containing arsenic by the combined solvent action of ferrous chloride, common salt, and free acids, as follows: first, using the solution of ferrous chloride and common salt without sulphurous acid; second, treating the clear neutral solution thus obtained, free from arsenic and peroxide of iron, with sulphurous acid to reduce the dissolved cupric to cuprous chloride, with generation of free acids; third, precipitating from this solution the copper by metallic iron, avoiding an excess of this, the acid liquid thus obtained being used, as in the first place, to dissolve fresh portions of the oxidized copper ore, with separation, as before, of hydrous peroxide of iron holding any arsenic which may have been dissolved, and the above steps of the process being repeated indefinitely with the same liquid.

In testimony whereof we affix our signatures in presence of two witnesses.

THOMAS STERRY HUNT.
JAMES DOUGLAS, JR.

Witnesses to Hunt's signature:
WENDELL A. ANDERSON,
PATRICK GORMAN.

Witnesses to Douglas, Jr.'s signature:
JAMES MCLEAN,
FRED. J. WOOD.